United States Patent [19]
Shima et al.

[11] 4,246,577
[45] Jan. 20, 1981

[54] TOOL BREAKAGE DETECTING APPARATUS

[75] Inventors: Yoshio Shima, Ohbu; Kyosuke Haga, Anjo; Kunihiko Eto, Toyota; Tetsuro Yamakage, Kariya, all of Japan

[73] Assignee: Toyoda-Koki Kabushiki-Kaisha, Aichi, Japan

[21] Appl. No.: 935,779

[22] Filed: Aug. 22, 1978

[30] Foreign Application Priority Data

Aug. 30, 1977 [JP] Japan .................. 52/103779

[51] Int. Cl.² .................. G01B 11/14; G05B 3/04; G08B 21/00
[52] U.S. Cl. .................. 340/680; 173/21; 235/92 MP; 318/572
[58] Field of Search .................. 340/680; 173/6, 10, 173/11, 20, 21; 235/92 MP; 318/572, 490

[56] References Cited

U.S. PATENT DOCUMENTS

| 3,001,421 | 9/1961 | Martens | 340/680 X |
| 3,339,434 | 9/1967 | Sparling | 340/680 X |
| 3,628,002 | 12/1971 | Meese et al. | 318/572 X |
| 3,646,419 | 2/1972 | Holy et al. | 318/572 X |
| 3,679,955 | 7/1972 | Rhoades | 318/572 |
| 3,754,178 | 8/1973 | Dormehl et al. | 318/572 |
| 3,794,814 | 2/1974 | Lay et al. | 235/92 MP |
| 3,840,792 | 10/1974 | Yokoe | 318/572 |

FOREIGN PATENT DOCUMENTS 52-65383 5/1977 Japan .

Primary Examiner—John W. Caldwell, Sr.
Assistant Examiner—Joseph E. Nowicki
Attorney, Agent, or Firm—Oblon, Fisher, Spivak, McClelland & Maier

[57] ABSTRACT

A tool breakage detecting apparatus is provided with a preset counter to be preset with a predetermined value. The content of the counter is subtracted one by one each time either one of a tool and a workpiece to be machined is moved a unit distance toward the other thereof from a cutting movement start position being spaced a predetermined distance from the other thereof. If the content of the counter is reduced an amount corresponding to a distance larger than the predetermined distance, tool breakage is detected.

6 Claims, 3 Drawing Figures

TOOL BREAKAGE DETECTING APPARATUS

BACKGROUND OF THE INVENTION

1. Field of the Invention:

The present invention relates to a tool breakage detecting apparatus for detecting breakage of a tool.

2. Description of the Prior Art:

In a conventional manner, prior to a machining operation on a workpiece, a tool is fed from a predetermined original position into contact with a reference block and this displacement amount of the tool is detected. Existence of tool breakage is detected depending upon whether this displacement amount is above a preset value. If existence of tool breakage is not detected, a plurality of machining operations are consecutively performed on a workpiece.

For this reason, it is impossible in the conventional manner to detect tool breakage prior to every machining operation and therefore it may happen that a workpiece will be machined by a broken tool and be damaged.

If tool breakage detection is performed by returning the tool to the original position after each machining operation, it is possible to detect tool breakage prior to every machining operation. However, this method has a disadvantage that the tool cycle time for machining operations becomes longer because of detection of tool breakage prior to every machining operation.

SUMMARY OF THE INVENTION

It is therefore an object of the present invention to provide a new and improved tool breakage detecting apparatus capable of detecting tool breakage prior to every machining operation in a simple and reliable manner, to thereby prevent a machining operation by a broken tool.

Another object of the present invention is to provide a new and improved tool breakage detecting apparatus of the character set forth above, wherein tool breakage is detected depending upon the content of counter means, which content is subtracted one by one each time either one of a tool and a workpiece is moved a unit distance toward the other thereof from a cutting movement start position unitl either one of the tool and the workpiece is moved into contact with the other thereof.

Briefly, according to the present invention, these and other objects are achieved by providing a tool breakage detecting apparatus in a machine tool including a bed, a work table mounted on the bed for mounting thereon a workpiece to be machined, a column, a tool spindle rotatably mounted upon the column for supporting a tool, and control means for effecting relative movement between the work table and the tool spindle at various speeds, as mentioned below. First signal generating means generates a signal when either one of the workpiece and the tool is in contact with the other thereof. Second signal generating means generates a signal each time either one of the workpiece and the tool is moved a unit distance relative to the other thereof. Third signal generating means continues to generate a signal when either one of the workpiece and the tool is positioned at a reference position spaced a predetermined distance from the other thereof to be moved therefrom relative to the other thereof at a cutting feed speed within the various speeds. Gate means is operatively connected to the first, second and third signal generating means to receive signals therefrom and to generate an output signal each time either one of the workpiece and the tool is moved the unit distance toward the other thereof from the reference position under the condition that the signal is generated from the third signal generating means but not generated from the first signal generating means. Counter means is provided to be presettable therein to a predetermined value. The counter means is responsive to the signal from the third signal generating means to be preset with the predetermined value. A content of the counter means is subtracted in response to the output signal from the gate means. The counter means generates a signal indicative of tool breakage when the content thereof is reduced an amount corresponding to a distance larger than the predetermined distance.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
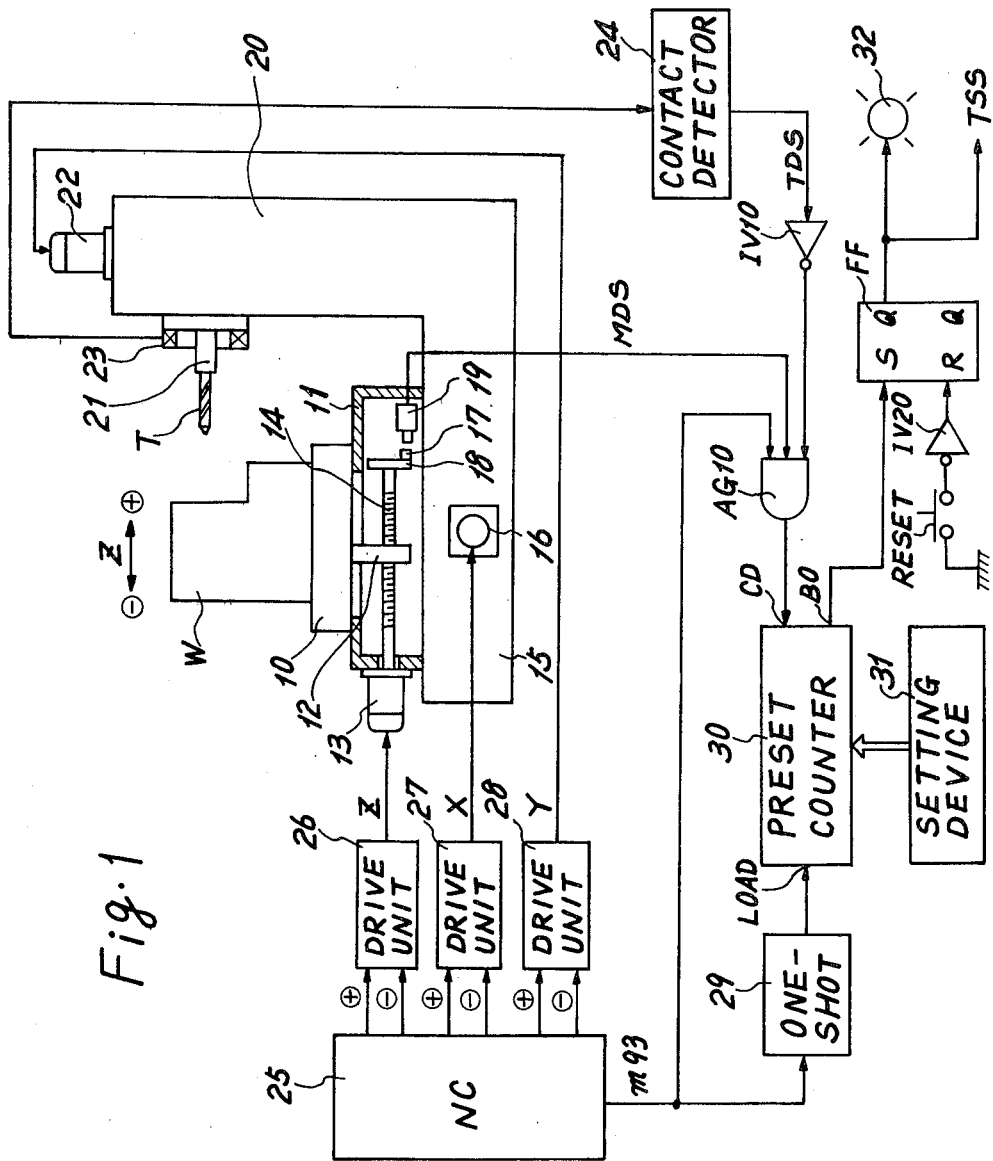
FIG. 1 is a block diagram showing a tool breakage detecting apparatus according to the present invention.

Referring now to the drawings, wherein like reference numerals or characters refer to identical or corresponding parts throughout the several views, and more particularly to FIG. 1, there is shown a work table 10 mounting thereon a workpiece W to be machined and slidably mounted on a saddle 11 to be movable to the left and right in the drawing (Z-axis direction). A feed nut 12 secured to the underside of the table 10 is threadedly engaged with a feed screw 14 which is rotated by a servomotor 13. Rotation of the servomotor 13 causes movement of the workpiece W in the Z-axis direction. The saddle 11 is adapted to be moved in a direction perpendicular to the drawing (X-axis direction) by a servomotor 16 secured to a bed 15, whereby the workpiece W is moved in the X-axis direction. The feed screw 14 has secured at its one end a rotary circular plate 18 which is provided with a dog 17. A proximity switch 19 is provided in opposed relation with the dog 17. With this arrangement, the proximity switch 19 is actuated to generate a displacement amount detecting signal MDS, each time the workpiece W is moved a predetermined unit distance, for example 1 mm. to rotate the rotary circular plate 18 one revolution.

A spindle 21 is mounted on a column 20 to support a tool T, such as a drill or tap and is rotated by a spindle motor, not shown. The spindle 21 is moved upward and downward (Y-axis direction) by a servomotor 22 secured to the top of the column 20 so that the tool T is moved in the Y-axis direction. A toroidal coil 23 is provided around the spindle 21. When this toroidal coil 23 is energized by alternating current, magnetic flux is created through the center of the winding of the toroidal coil 23. Since this magnetic flux surrounds the spindle 21 and the tool T, induced current is created in the axial direction of the spindle 21. When the workpiece W is in contact with the tool T, a closed loop induced current is formed through the machine body as a conductive element, whereby the impedance of the toroidal coil 23 is changed. This change in impedance is detected by a contact detecting circuit 24 which generates a contact detecting signal TDS when the workpiece W is in contact with the tool T.

Reference numeral 25 denotes a numerical control device for controlling a machining operation on the workpiece W in accordance with numerical control information applied by a punched tape or the like. This numerical control device 25 supplies, in accordance with numerical control information, command pulses to either forward or reverse rotation input terminals $\ominus$ or $\oplus$ of drive units 26, 27 and 28 for the control of the servomotors 13, 16 and 22. It is to be understood that, in the Z-axis, a positive direction is defined as that where the workpice W moves toward the tool T.

It is also to be understood that in this numerical control device 25, one auxiliary function command M93 is assigned for two auxiliary functions, that is, forward rotation of the spindle motor and detection of tool breakage. When the auxiliary function command M93 in one block of numerical control information is read out, an auxiliary signal m93 continues to be generated until a pulse distribution of that block is completed. When this auxiliary signal m93 is generated, rotation of the spindle motor is started by a relay control circuit, not shown, and a one-shot multivibrator 29 detects generation of the auxiliary signal m93 to generate a signal therefrom for a predetermined time period.

Figure 2:
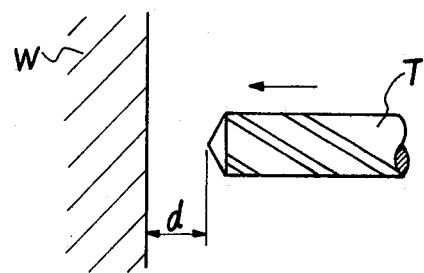
FIG. 2 shows a relationship between a tool and the machining surface of a workpiece at a cutting feed movement start position.

A preset counter 30 is provided to count a displacement amount of the workpiece W from a predetermined cutting movement start position to a position where a machining surface of the workpiece W is in contact with the tool T and to judge whether this displacement amount is above a preset value. This preset counter 30 receives at its LOAD terminal a signal generated from the one-shot multivibrator 29 to preset therein a setting value preset in a displacement amount setting device 31 as an initial value. The setting value preset in this displacement amount setting device 31 is determined to be larger than a quotient of an air gap amount d divided by the predetermined unit distance, wherein the air gap amount d is defined as a distane between the machining surface of the workpiece W at the cutting movement start position and the tip of the tool T, as shown in FIG. 2. For example, the setting value is 7 mm., when the air gap amount d is 5 mm. and the unit distance is 1 mm. Accordingly, in preparing a numerical control information for machining operations on the workpiece W, it is necessary to program an air gap amount to be smaller than the setting value at every machining operation.

The preset counter 30 receives at its subtraction terminal CD a signal generated from an AND gate AG10, which receives, at its input terminals, the displacement amount detecting signal MDS generated from the proximity switch 19, the auxiliary signal m93 generated from the numerical control device 25, and a signal into which the contact detecting signal TDS generated from the contact detecting circuit 24 is inverted by an inverter IV10. Therfore, when the auxiliary signal m93 is applied from the numerical control device 25 under the condition that the contact detecting signal TDS is not generated from the contact detecting circuit 24, an output signal is applied from the AND gate AG10 to the subtraction terminal of the preset counter 30, each time the displacement amount detecting signal MDS is generated from the proximity switch 19. Accordingly, the setting value preset in the preset counter 30 is subtracted by the displacement amount detecting signal MDS. When the counted value in the preset counter 30 becomes zero, the preset counter 30 generates a signal from its borrow terminal BO at the moment when the content becomes negative from zero. When the content detecting signal TDS is generated form the contact detecting circuit 24 in accordance with contact of the machining surface of the workpiece W with the tool T, the AND gate AG10 is closed to interrupt the subtraction of the preset counter 30.

A signal generated from the borrow terminal BO of the preset counter 30 is applied to a set input terminal S of a flip flop FF to set the same. A signal generated from a set output terminal Q of this flip flop FF is applied to a tool breakage indicator 32 to indicate the occurence of tool breakage. A signal generated from the set output terminal Q of the flip flop FF is also applied as a breakage detecting signal TSS to the relay control circuit, not shown, which controls an interruption of the cutting feed movement, exchange of the broken tool and resumption of the machining operation. A reset input terminal R of the flip flop FF is connected through the inverter IV20 to a reset switch RESET so that the flip flop FF is reset prior to a machining operation on the workpiece W.

Figure 3:
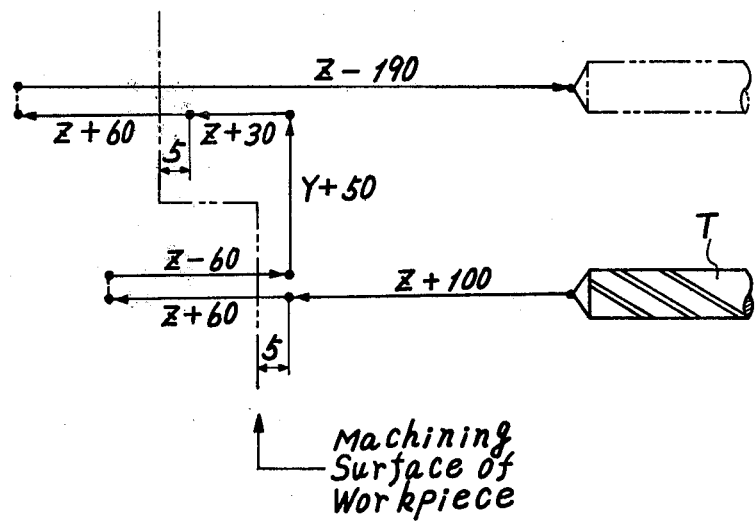
FIG. 3 shows a moving path of the tool in accordance with a numerical control.

The operation of the tool breakage detecting apparatus according to the present invention will be now described. TABLE 1 shows an example of numerical control information. The workpiece W and the tool T are moved in accordance with numerical control information at sequence numbers 100 to 106 in order to make two bores on a machining surface of the workpiece W. It is to be understood that the tool T is shown to be moved relative to the workpiece W in FIG. 3, while the workpiece W is actually moved relative to the tool T in this embodiment. It is also to be understood that a movement amount in TABLE 1 is shown in mm.

TABLE 1

| Sequence No. | Numerical Control Information | | |
|---|---|---|---|
| . | . | | |
| . | . | | |
| . | . | | |
| 100 | Z + 100 | F2000 | |
| 101 | Z + 60 | F50 | M93 |
| 102 | Z − 60 | F500 | |
| 103 | Y + 50 | F500 | |
| 104 | Z + 30 | F500 | |
| 105 | Z + 60 | F50 | M93 |
| 106 | Z − 190 | F2000 | |
| . | . | | |
| . | . | | |

When numerical control information Z+100 F2000 at the sequence No. 100 is read out by the numerical control device 25 after the completion of execution of numerical control up to the sequence No. 99, the numerical control device 25 generates, to the forward rotation input terminal $\ominus$ of the drive unit 26, command pulses with high frequency depending upon the feed command F2000. Accordingly, the servomotor 13 is rotated in the forward direction to move the work table 10 toward the tool T through the feed screw 14. Since the feed command F2000 is a command for rapid feed movement, the workpiece W is moved with the work table 10 rapidly toward the tool T. At this time, the displacement amount detecting signal MDS is generated from the proximity switch 19 through the rotation of the feed screw 14. However, the auxiliary signal m93 is not generated at this time from the numerical control device 25, so that the AND gate AG10 is maintained closed and the preset counter 30 is maintained at ZERO reset condition.

When the workpiece W is advanced 100 mm. into its advanced position at the rapid feed rate, a pulse distribution in the sequence No. 100 is completed. Since this rapid advanced position is a cutting feed movement start position, the machining surface of the workpiece W is positioned at a position retracted 5 mm. from the tip of the tool T without breakage.

When numerical control information Z+60 F50 M93 is subsequently read out by the numerical control device 25, the numerical control device 25 identifies at first that the auxiliary function command M93 is programmed and generates the auxiliary signal m93. With the auxiliary signal m93 being generated from the numerical control device 25, the relay control circuit, not shown, energizes the spindle motor to rotate the spindle 21 in the forward direction. Generation of the auxiliary signal m93 is also detected by the one-shot multivibrator 29, which therefore generates a signal. Accordingly, the setting value 7 set in the displacement amount setting device 31 is preset in the preset counter 30 as an initial value.

The auxiliary signal m93 generated from the numerical control device 25 is also applied to the AND gate AG10 which is opened at this time, since an output of the inverter IV10 is in "H" state because of no contact of the workpiece W with the tool T. Accordingly, the displacement amount detecting signal MDS generated from the proximity switch 19 is applied to the preset counter 30.

When a pulse distribution with a frequency corresponding to the feed command F50 is initiated, the servomotor 13 is rotated at a slow speed to advance the workpiece W at the cutting feed rate. Simultaneously therewith, the rotary circular plate 18 is rotated, so that the proximity switch 19 is actuated to generate the displacement amount detecting signal MDS each time the workpiece W is advanced 1 mm. Accordingly, the initial value 7 in the preset counter 30 is subtracted one by one each time the workpiece W is advanced 1 mm.

If the tool T is normal, the machining surface of the workpiece W is in contact with the tip of the tool T, when the workpiece W is advanced 5 mm. from the cutting feed movement start position. That is, when the content of the preset counter 30 becomes 2, the contact detecting circuit 24 generates the contact detecting signal TDS to close the AND gate AG10. Therefore, subtraction of the preset counter 30 is stopped and no signal is generated from the borrow terminal BO of the preset counter 30.

However, if the tool T is in breakage, the machining surface of the workpiece W is not in contact with the tip of the tool T, even when the workpiece W is advanced 5 mm. from the cutting feed movement start position. Accordingly, the preset counter 30 is further subtracted, and when the counted value in the preset counter 30 is changed from zero to negative in response to the 8 mm. movement of the workpiece W, a signal is generated from the borrow terminal BO. The flip flop FF is therefore set to memorize the occurrence of tool breakage. With the flip flop FF being set, a signal is generated from the set output terminal Q of the flip flop FF, whereby the tool breakage indicator 32 indicates breakage of the tool T. The breakage detecting signal TSS is also applied to the relay control circuit, not shown, to perform an interruption of the cutting feed movement, exchange of the broken tool and resumption of the machining operation.

Assuming now that the tool T is normal, the workpiece W is advanced 60 mm. from the cutting feed movement start position for a drilling operation. When the drilling operation is completed, the workpiece W is rapidly retracted to the cutting feed movement start position in accordance with numerical control information Z−60 F500 at the sequence No. 102.

When numerical control information Y+50 F500 at the sequence No. 103 is subsequently read out, the tool T is positioned at a position corresponding to another machining point of the machining surface. When numerical control information Z+30 F500 at the sequence No. 104 is then read out, the workpiece W is rapidly moved into a cutting feed movement start position. Similar to the above-mentioned first drilling operation, the cutting feed movement start position of the workpiece W is at a position retracted an air gap amount of 5 mm. from the tip of the tool T.

When numerical control information Z+60 F50 M93 at the sequence No. 105 is subsequently read out, the workpiece W is fed at a cutting feed speed. Since the auxiliary function command M93 is programmed in this information, the setting value in the displacement amount setting device 31 is preset in the preset counter 30 and a tool breakage detection is performed in a similar manner to the previous drilling operation. If breakage of the tool T is not detected, a drilling operation is performed. The workpiece W is returned to the original position for a succeeding machining operation in accordance with numerical control information Z−190 F2000 at the sequence No. 106.

In this manner, even when a plurality of machining operations are successively performed, existence or non-existence of tool breakage can be detected prior to every machining operation.

The tool breakage detecting apparatus according to the present invention is applied to the numerically controlled machining tool in the above-mentioned embodiment. However, it is to be understood that it is possible to apply it to an ordinary feed unit.

What is claimed is:

1. In a machine tool including a bed, a work table mounted on said bed for mounting thereon a workpiece to be machined, a column, a tool spindle rotatably mounted upon said column for supporting a tool, a control means for effecting relative movement between said work table and said tool spindle at various speeds, a tool breakage detecting apparatus comprising:

first signal generating means for generating a signal when either one of the workpiece and the tool is in contact with the other thereof;

second signal generating means for generating a signal each time either one of the workpiece and the tool is moved a unit distance relative to the other thereof;

third signal generating means for continuing to generate a signal when either one of the workpiece and the tool is positioned at a reference position spaced a predetermined distance from the other thereof to be moved therefrom relative to the other thereof at a cutting feed speed within said various speeds;

gate means operatively connected to said first, second and third signal generating means to receive signals therefrom and to generate an output signal each time either one of the workpiece and the tool is moved said unit distance toward the other thereof from said reference position under the condition that the signal is generated from said third signal generating means but not generated from said first signal generating means; and counter means presettable therein to a predetermined value corresponding to said predetermined distance and responsive to the signal from said third signal generating means to be preset with said predetermined value;

said predetermined value of said counter means being subtracted by the signal generated by said second signal generating means in response to the output signal from said gate means; and said counter means generating a signal indicative of tool breakage when the content thereof is reduced an amount corresponding to a distance larger than the predetermined distance.

2. A tool breakage detecting apparatus as set forth in claim 1, wherein:

said third signal generating means is a numerical control device for reading out numerical control information including auxiliary function data to generate said signal when either one of the workpiece and the tool is to be moved from said reference position toward the other thereof at the cutting feed speed.

3. A tool breakage detecting apparatus as set forth in claim 1, wherein:

said first signal generating means comprises a toroidal coil surrounding said tool spindle to detect a change in impedance thereof when the tool is in contact with the workpiece.

4. A tool breakage detecting apparatus as set forth in claim 2 or 3, wherein: said gate means is an AND gate and is connected to said first signal generating means through an inverter.

5. A tool breakage detecting apparatus as set forth in claim 4, including: a flip flop connected at its set input terminal to said counter means to be set by the signal generated from said counter means indicative of tool breakage, and an indicator connected to a set output terminal of said flip flop for indicating tool breakage.

6. A tool breakage detecting apparatus as set forth in claim 4, including:

setting means storing therein said predetermined value, said counter means being preset with said predetermined value stored in said setting means in response to a signal from said third signal generating means.

* * * * *